United States Patent [19]

Giglia et al.

[11] 4,215,917

[45] Aug. 5, 1980

[54] ION EXCHANGE-ELECTROLYTE LAYER FOR ELECTROCHROMIC DEVICES

[75] Inventors: Robert D. Giglia, Rye; Thomas B. Reddy, Pound Ridge, both of N.Y.

[73] Assignee: American Cyanamid Company, Stamford, Conn.

[21] Appl. No.: 735,940

[22] Filed: Oct. 27, 1976

[51] Int. Cl.² ............................................. G02F 1/17
[52] U.S. Cl. ..................................... 350/357; 252/500; 252/408; 521/27
[58] Field of Search ........................... 252/500, 408; 350/160 R, 357; 260/2.2 R; 521/27, 30, 260-2.2 R

[56] References Cited

U.S. PATENT DOCUMENTS

| | | | |
|---|---|---|---|
| 2,527,300 | 10/1950 | Dudley | 260/2.2 R |
| 3,341,366 | 9/1967 | Hodgdon, Jr. et al. | 260/2.2 R |
| 3,419,431 | 12/1968 | Michaels | 252/408 R |
| 3,453,038 | 7/1969 | Kissa et al. | 350/357 |
| 3,528,858 | 9/1970 | Hodgdon, Jr. et al. | 260/2.2 R |
| 3,684,747 | 8/1972 | Coalson | 260/2.2 R |
| 3,704,057 | 11/1972 | Beegle | 350/160 R |
| 3,708,220 | 1/1973 | Meyers et al. | 350/160 R |
| 3,819,252 | 6/1974 | Giglia | 350/160 R |
| 3,827,784 | 8/1974 | Giglia et al. | 350/160 P |
| 3,840,288 | 10/1974 | Schnatterly | 350/357 |
| 3,970,365 | 7/1976 | Giglia | 350/160 R |
| 3,971,624 | 7/1976 | Bruesch et al. | 350/160 R |

FOREIGN PATENT DOCUMENTS 2603200 8/1976 Fed. Rep. of Germany ...... 350/160 R

*Primary Examiner*—Benjamin R. Padgett
*Assistant Examiner*—T. S. Gron
*Attorney, Agent, or Firm*—Robert J. Feltovic; Gordon L. Hart

[57] ABSTRACT

Disclosed is an electrochromic variable light modulating device including an improved ion conducting medium comprising a solid or semi-solid layer of polymer of the ion exchange type wetted with a small amount of water and/or acid electrolyte solution.

12 Claims, No Drawings

ION EXCHANGE-ELECTROLYTE LAYER FOR ELECTROCHROMIC DEVICES

The invention relates to electro-optical devices whose electromagnetic radiation absorption characteristics can be selectively altered by the influence of a suitably controlled electric field. More particularly, the invention relates to variable light modulating devices which include a light transmitting substrate with a layer of persistent electrochromic material as a light modulating material and a counter-electrode separated from the electrochromic layer by an ion conducting medium. In specific, the invention is directed to an improved ion conducting medium for electrochromic devices and a method for forming such a medium.

Electrochromic devices are known in the art and are exemplified by prior, commonly assigned, U.S. Pat. Nos., such as 3,704,057, 3,708,220, 3,819,252 and 3,970,365. These patents describe suitable materials and methods for forming the overall electrochromic device of the present invention. The device preferably is formed in a sandwich arrangement of a substrate, an electrochromic material, an ion-conducting medium and a counter-electrode. The light transmitting substrate includes a coating of a conductive material, such as tin oxide. This substrate may be conveniently provided as a unit by commercially available NESA glass, which is a product having a transparent coating of tin oxide on one surface of a glass sheet. The electrochromic material may be deposited on the tin oxide layer by known vacuum deposition techniques. Further, the listed patents serve to illustrate various ion conducting media which previously have been utilized. In U.S. Pat. No. 3,704,057, use of a liquid acid electrolyte is shown; U.S. Pat. No. 3,708,220 introduces a semi-solid conductive electrolyte gel. In an effort to improve device life, U.S. Pat. Nos. 3,819,252 and 3,970,365 incorporate selected additives into a semi-solid ion conductive gel.

Although prior ion-conducting media have been effective in successfully operated electrochromic devices, the achievement of long device life continues as a soughtafter goal. The present ion exchange medium is designed to provide an electrochromic device with an improved life. Electrochromic devices, such as those disclosed in the cited patents, having substantial amounts of free acid electrolyte present are known to have limited cell life due to a slow process involving dissolution of the electrochromic film layer. Therefore, in order to minimize this erosion process, the present invention provides for the use of only a very small amount of free electrolyte in combination with a membrane of ion exchange material. The ion exchange membrane has a high conductivity to protons, so as to permit effective ionic conductance. Further, while the free electrolyte provides good switching speed by establishing inter facial contact between polymer layer and electrode surfaces and by enhancing ion conductivity, it is present in a minimal amount to limit dissolution of electrochromic material. The preferred electrolyte used to wet the membrane is a water and/or acid solution. The ion exchange membrane may be any polymeric organic material containing one or more ionic groups of the type used as ion exchangers. Preferred ion exchange membrane components are materials such as sulfonated polyphenylene oxide, perfluorosulfonic acid copolymers, polystyrene sulfonic acid, fluorinated ethylene propylene sulfonic acid, sulfonated polyethylene, perfluoro poly (styrene sulfonic acid), and sulfonated copolymers of vinyl compounds. These sulfonic acid membranes are exemplified by the following commercially available materials: Amicon UM-05 (Amicon, Corp.); Ionac MC-3142 and MC-3470 (Ionac Chemical Co.); Ionics G1AZL183, G1AZL066, G1AZL065, G1AZG067, G1CZL183, G1AZS068, and G1DYG067 (Ionics, Inc.); Acropor SA (Gelman Instrument Co.); DuPont Nafion (E.I. duPont); GEP3-18A and G.E. H-42 (General Electric Co.); RAI 4010, 5010, and P1010, and P1010 (RA1 Research, Inc.).

In many embodiments it is preferred to provide background coloration for the cell in order to have a contrasting surface against which an electrochromic display can be readily viewed. Such color may be added by pigmenting the ion exchange resin or by coating the counter-electrode with a pigmented ion-permeable layer.

The following example illustrates a preferred embodiment of the invention:

An electrochromic device was constructed from a NESA glass plate and a stainless steel plate. The conductive NESA plate was coated with a 0.5 micron thick evaporated film of tungsten oxide in the form of a numeral eight. A type 316 stainless steel plate was coated with Dixon Crucible Co. Graphokote No. 120 graphite film. The coated stainless steel plate was baked at 300° C. for 1/2 hour then cooled to room temperature and soaked in a solution of glycerin and sulfuric acid. Following an acetone rinse and room temperature air dry the graphite layer was coated with a partially saturated solution of $WO_3$ in 29% $NH_4OH$. Next the electrode was dried by heating to about 60° C. in air for ½ hour. After cooling to room temperature the electrode was soaked in a solution of glycerin-sulfuric acid 10:1 by volume for a period of 24 hours. The electrode was rinsed in acetone and room temperature air dried.

The two electrodes so formed were pressed together with the electrochromic and graphite films facing each other but separated by a layer of a modified sulfonated polyphenylene oxide film, commercially available as General Electric Co. ion exchange resin film H-42, wetted with 10:1 solution of glycerin-sulfuric acid and a layer of 10:1 glycerin-sulfuric acid mixed with Sun Yellow C pigment to provide a background to contrast with the colored tungsten oxide image.

The EC device was tested by alternately coloring and erasing the numeral image at a DC potential of 1.05 volt. A 0.8 second coloration time produced about 40% contrast level. Upon reversing the potential the image was erased in 1.4 seconds.

While the operation of the invention is not completely understood, it may be that the ion exchange polymer layer serves to restrict movement of the substrate electrochromic material cation by blocking its migration across the polymer barrier, while permitting movement back and forth of the much smaller proton during switching. The blocking of electrochromic material cation in conjunction with minimized acid electrolyte serves to reduce deterioration of the electrochromic layer thereby extending cell life while maintaining good switching speed.

We claim:

1. In an electrochromic variable light modulating device having an arrangement comprising a light transmitting substrate with a persistent electrochromic material as a light modulating material and a counter-electrode separated from said substrate by an ion conducting medium, an improved ion conducting medium comprising a polymeric ion exchange membrane layer wetted with an electrolyte solution.

2. The electrochromic device of claim 1 wherein the ion exchange resin is wetted with an acid solution.

3. The electrochromic device of claim 2 wherein the electrolyte solution is a dilute solution of sulfuric acid.

4. The electrochromic device of claim 2 wherein said ion exchange resin is of the sulfonated polyphenylene oxide type.

5. The electrochromic device of claim 2 wherein said ion exchange resin is of the perfluorosulfonic acid type.

6. The elecrochromic device of claim 2 wherein said ion exchange resin is of the polystyrene sulfonic acid type.

7. The electrochromic device of claim 6 wherein said ion exchange resin is a perfluoro polystyrene sulfonic acid.

8. The electrochromic device of claim 2 wherein said ion exchange resin is of the fluorinated ethylene propylene sulfonic acid type.

9. The electrochromic device of claim 2 wherein said ion exchange resin is of the sulfonated polyethylene type.

10. The electrochromic device of claim 2 wherein the ion conducting medium includes a pigment to provide a color background contrast for the persistent electrochromic material.

11. A process of making an electrochromic variable light modulating device with an ion conducting medium as described in claim 1, comprising
fashioning a layer of polymeric ion exchange material to a size and shape compatible with the light transmitting substrate and the counter-electrode,
wetting said ion exchange material with an electrolyte solution,
inserting the wetted ion exchange material in the electrochromic device between said substrate and said counter-electrode.

12. The process of claim 11 including adding a pigment to the ion conducting medium so as to offer a contrasting background for the electrochromic material.

* * * * *